Jan. 22, 1946.    C. M. HINES    2,393,375
DECELEROMETER APPARATUS
Filed Oct. 29, 1942
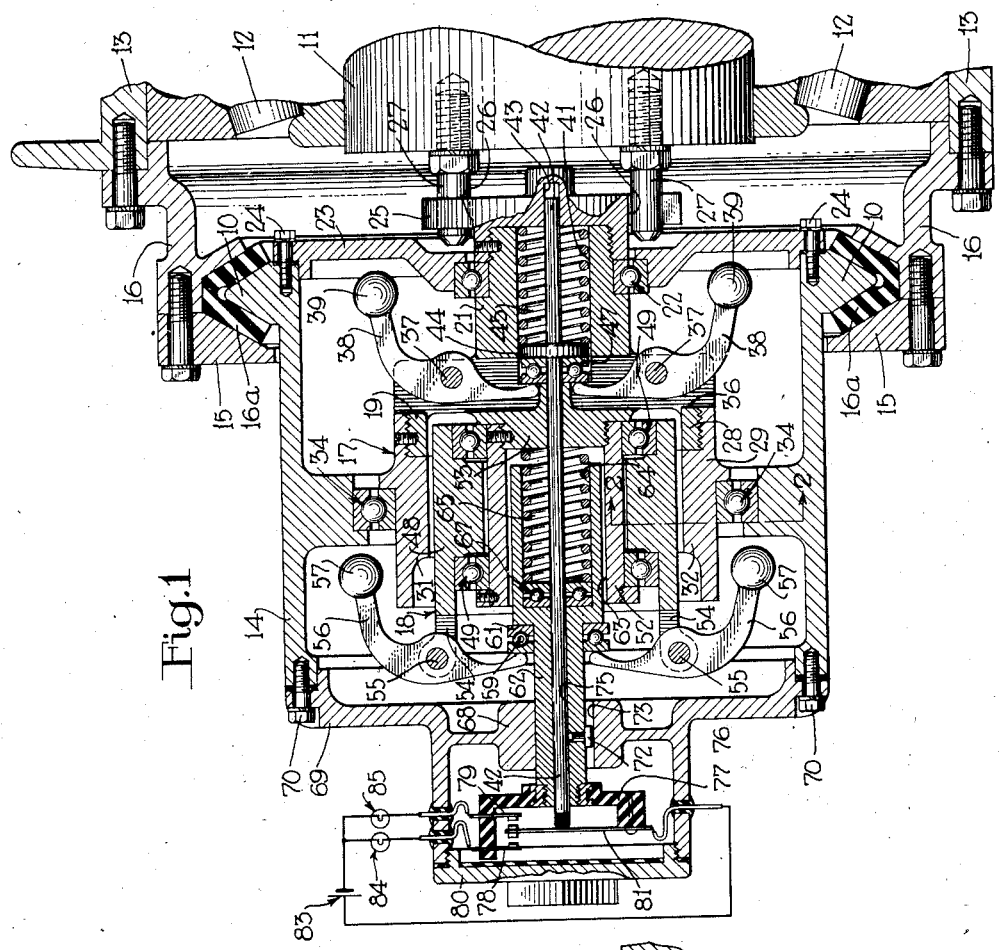
INVENTOR
Claude M. Hines
BY
ATTORNEY Patented Jan. 22, 1946

2,393,375

UNITED STATES PATENT OFFICE 2,393,375

DECELEROMETER APPARATUS

Claude M. Hines, Pittsburgh, Pa., assignor to The Westinghouse Air Brake Company, Wilmerding, Pa., a corporation of Pennsylvania Application October 29, 1942, Serial No. 463,749

5 Claims. (Cl. 200—80)

This invention relates to apparatus, designated for convenience herein as decelerometer apparatus, effective to detect or register variations in the rate of rotational acceleration or deceleration of a rotary element and has particular relation to decelerometer apparatus of the rotary inertia type.

Heretofore known decelerometer apparatus of the rotary inertia type comprises essentially a fly-wheel that is driven through a resilient connection from a driving shaft and that has rotational movement with respect to the driving shaft in proportion to the rate of acceleration or deceleration of the driving shaft. Such decelerometer apparatus has been employed for detecting the rate of rotative acceleration or deceleration of a railway car wheel or wheel and axle unit for a desired indicating or control purpose. For example, such decelerometer apparatus has been employed to detect the slipping condition of vehicle wheels on the basis of the abnormal rate of rotative deceleration or acceleration of the wheels during the slipping condition thereof and to so control the brakes associated with the slipping wheels, or the propulsion means applying propulsion torque to the wheels, in a manner to prevent sliding of the wheels and to cause cessation of the slipping condition.

The terms "slipping" and "sliding" as applied herein to vehicle wheels are not synonymous. The term "slipping" refers to rotation of a vehicle wheel at speeds different from that corresponding to vehicle speed at a given instant; whereas, the term "sliding" refers solely to the locked or non-rotative condition of a vehicle wheel.

My present invention is a novel form of decelerometer apparatus suited particularly for detecting the slipping condition of railway car wheels. It comprises essentially (1) a fly-wheel element driven by rotation of a driving shaft, through an eddy current clutch, at a speed having a substantially constant normal percentage slip relation to the driving shaft; (2) two centrifuge devices, one rotatable at all times according to the rotational speed of the driving shaft, and the other rotatable at all times according to the rotational speed of the fly-wheel element; and (3) two elements respectively responsive to the instantaneous rotational speeds of the two centrifuge devices and cooperating in a manner to effect operation of a switch device only when the respective rotational speeds of the two centrifuge devices vary substantially from their normal relation corresponding to the normal percentage slip of the fly-wheel with respect to the speed of the driving shaft. The percentage slip of the fly-wheel with respect to the speed of the driving shaft in turn varies with the rate of acceleration or deceleration of the driving shaft.

My decelerometer apparatus is particularly suited for the control of vehicle wheel brakes in that it not only initiates the release of the brakes substantially at the instant the slipping condition of the vehicle wheel occurs, but also inherently operates to cause a continuing reduction in the degree of application of the brakes associated with the wheel as long as the wheel is in a slipping condition. The manner in which my improved decelerometer apparatus effects this result will be pointed out in detail hereinafter but it is sufficient to state for the moment that my improved decelerometer apparatus differs from heretofore known rotary inertia type decelerometer apparatus in that it obviates the need for additional apparatus, required in connection with heretofore known rotary inertia type decelerometer apparatus, for causing a continuing reduction in the degree of application of the brakes after the decelerometer apparatus initiates the reduction in the degree of application of the brakes.

It is accordingly an object of my invention to provide novel decelerometer apparatus of the rotary inertia type for detecting variations in the rate of acceleration or deceleration of a rotary element.

More specifically, it is an object of my invention to provide novel decelerometer apparatus of the rotary inertia type which is not only operatively responsive to the slipping condition of a vehicle wheel but which is inherently maintained in its operated condition notwithstanding changes in the rate of deceleration or acceleration of the slipping wheels occurring in response to the initial operation of the apparatus.

The above objects, and other objects of my invention which will be made apparent hereinafter, are attained by means of apparatus subsequently to be described and shown in the accompanying drawing wherein Fig. 1 is a vertical sectional view, illustratively showing my novel decelerometer apparatus as employed in connection with a railway car wheel and axle unit, Fig. 2 is a fragmental sectional view, taken on the line 2—2 of Fig. 1, showing further details of construction, and Fig. 3 is a fragmental diagrammatic view showing the manner in which my decelerometer apparatus may be utilized to control the fluid pressure brakes of a vehicle, such as a railway car or train, in a manner to prevent sliding of the vehicle wheels.

Description

Referring to the drawing, my novel decelerometer apparatus is shown in connection with the axle 11 of a railway car wheel and axle unit, the axle being journaled at one end as by roller bearings 12 in a journal casing 13.

The decelerometer apparatus comprises a suitable tubular or cylindrical casing 14 which is secured by a clamping ring 15 to an adapter ring 16 that is, in turn, secured to the end of the journal casing 13 in place of the usual end cover. Casing 14 has a radially extending flange 19, of V-shape in cross section, that is resiliently clamped between the clamping ring 15 and the adapter ring 16 with an intervening cushioning ring 16a of rubber or other similar material, for absorbing shock and vibration which would otherwise be transmitted from the axle 11.

Two centrifuge devices 17 and 18, respectively, are rotatively mounted within the casing 14.

The centrifuge device 17 comprises a non-magnetic disk portion 19 having an integral hub portion 21 rotatively mounted, as by a roller bearing race 22, in the central opening of an end flange or cover 23 attached as by screws 24 to the casing 14. Screwed on the end of the hub 21 is a flange member 25 having a plurality of radially extending slots 26, shown illustratively as two in number, in which the smooth outer ends of stud bolts 27 screwed into the end of the axle 11, are received to provide a driving connection or coupling between the centrifuge device 17 and the axle 11.

The disk 19 has an externally threaded annular projection 28 on which a cylindrical member 29 is screwed in coaxial relation to the axle 11. Cylindrical member 29 is of magnetic material and is formed to provide two diametrically opposite radially extending salient pole-pieces 31 and 32. The member 29 is permanently magnetized so as to cause the pole-pieces 31 and 32 to be of opposite magnetic polarity.

A ball bearing race 34, retained in the casing 14, provides a support for member 29 and consequently the end of the centrifuge device 17.

The disk 19 is provided with oppositely extending radial slots 36, in each of which a lever 38 carrying a weight 39 at the end thereof, is pivotally mounted as on a pin 37.

The hub 21 of the centrifuge device 17 has a central bore 41. Extending axially through the bore 41 is a switch operating rod 42, one end of which is slidably supported in a recess 43 in the flange member 25 in coaxial relation to the axis of rotation of the axle 11. The rod 42 has a collar 44 fixed thereon, and a coil spring 45 is interposed in the bore 41 between the collar 44 and the flange member 25 and yieldingly urges the rod 42 in the left-hand direction.

The inner ends of the levers 38 extend into close proximity to the rod 42 and exert a force on the collar 44 in opposition to the force of spring 45 due to the centrifugal force acting on the weights 39 when the centrifuge device 17 is rotated. A suitable thrust bearing 47 is interposed between the ends of the levers 38 and the collar 44 to eliminate friction between the levers and the collar due to rotation of the disk 19 with respect to rod 42.

The rod 42 is accordingly shifted axially to different positions by the centrifugal force acting on the weights 39 of the centrifuge device 17 in correspondence with the speed of rotation of the axle 11.

The centrifuge device 18 comprises a combined inductor ring and fly-wheel 48, hereafter referred to simply as the fly-wheel, which is rotatably supported in coaxial relation to the axle 11 on a cylindrical member 52 that is attached, as by a screw-threaded connection, to a central boss 53 on the disk 19 of centrifuge device 17. Two ball bearing races 49, one at each end of the fly-wheel 48, may be provided for rotatably mounting the fly-wheel on the member 52.

The fly-wheel 48 is of metal having electric current conducting properties, such as copper, brass or alloys thereof, and thus acts as an inductor ring in association with the pole-pieces 31 and 32 to form an eddy current type of clutch and brake between the disk 19 and the fly-wheel 48.

The outer end of the fly-wheel 48 has two yokes 54, in each of which a lever 56 that carries a weight 57 at the outer end thereof is pivotally supported, as on a pin 55. The inner ends of the two levers 56 act through a suitable thrust bearing race 59 on a shoulder 61 formed on a sleeve member 62.

The sleeve member 62 is slidably supported at one end in a smooth bore 63 of the cylindrical member 52. A coil spring 65 retained in a bore 64 in the sleeve member 62 engages the boss 53 of the disk 19 at one end and a thrust bearing race 67 contained in the bore 64 at its other end, to exert a force on the sleeve member 62 urging it in the left-hand direction.

Sleeve member 62 has a portion of reduced diameter at the left-hand end thereof which is slidably supported in a suitable journal bearing or hub 68 formed in or attached to an end cover 69 that is, in turn, attached as by a plurality of screws 70 to the outer end of the casing 14.

A key 72 carried by the sleeve member 62 engages in a slot 73 in the hub 68 to permit axial sliding movement of the sleeve member 62 with respect to the hub while preventing rotation of the sleeve. It will be seen that the thrust bearing race 59 permits cooperation of the levers 56 of the centrifuge device 18 with the sleeve member 62 so as to minimize friction due to the rotation of the arms 56 with respect to the sleeve. In a similar manner, the thrust bearing race 67 permits the spring 65 to exert a force on the non-rotative sleeve 62 while the spring rotates with the disk 19 of the centrifuge device 17.

It will be accordingly understood that the centrifugal force acting on the weights 57 is effective to urge the sleeve member 62 in the right-hand direction in opposition to the force of the spring 65, the axial position assumed by the sleeve member 62 corresponding substantially to the actual speed of rotation of the centrifuge device 18.

The switch operating rod 42 extends through and projects out of a central bore 75 in the portion of the sleeve member 62 of reduced diameter and is slidably guided therein.

Secured on the end of the sleeve member 62 within a chamber 76 formed by a central tubular extension of the end cover 69 and closed by a removable cover plate 80, is a base 77 of suitable insulating material. Two flexible contact fingers 78 and 79 are secured to the base 77 in axially spaced relation on one side of the rod 42. A flexible contact finger 81 is secured to the base 77 and extends diametrically into the space between the two contact fingers 78 and 79 for cooperative alternative engagement therewith in the manner presently to be explained.

The contact finger 81 is of such character and location as to have an inherent bias in the direction of the contact finger 79. The outer or tip end of the rod 42 is of insulating material and engages the contact finger 81 to shift the contact finger 81 to a normal position midway between and not engaging the contact fingers 78 and 79 in the normal relative positions of the rod 42 and sleeve 62.

When the rod 42 shifts in the left-hand direction relative to the sleeve member 62, the contact finger 81 is bent into contact with the contact finger 78. When the rod 42 is shifted in the right-hand direction with respect to the sleeve 62, the inherent bias of contact finger 81 causes it to engage the contact finger 79.

As will be explained more fully presently, contact finger 81 engages the contact finger 78 in response to deceleration of the axle 11 and engages the contact finger 79 in response to acceleration of the axle 11.

The switches formed by the contact fingers 81, 78, and 79 may be employed for any desired indicating or control purpose. By way of example, I have shown a simple circuit including a source of current in the form of a storage battery 83 and two signal lamps 84 and 85. The arrangement is such that when the contact finger 81 engages contact finger 78, the circuit for the signal lamp 84 is completed and when the contact finger 81 engages the contact finger 79 the circuit for the signal lamp 85 is completed.

Operation

When the axle 11 is not rotating, the rod 42 and the sleeve 62 are respectively shifted to their normal positions, in which they are shown, by the springs 45 and 65 respectively. The rod 42 is thus so related in position normally with respect to the sleeve 62 that the contact finger 81 is positioned centrally between and out of contact with the two contact fingers 78 and 79. The circuits for the two signal lamps 84 and 85 are correspondingly interrupted.

Upon the rotative acceleration of the axle 11, the centrifuge device 18 is rotatively driven in response to rotation of the centrifuge device 17 by reason of the eddy current clutch formed by the combined inductor ring and fly-wheel 48 and the magnetic member 29. As is usual in the case of eddy current clutches, with a given load thereon the driven element has a certain percentage slip or lag in rotational speed with respect to the rotational speed of the driving element. The term "slip" as used in this connection is distinct in meaning from and is not to be confused with the term "slip" as applied to vehicle wheels. Thus, the fly-wheel 48, corresponding to the driven element, has a certain normal and substantially constant percentage slip or lag with respect to the rotational speed of the member 29, corresponding to the driving element. The normal per cent slip of the fly-wheel 48 with respect to axle 11 is thus substantially constant. Some variation in the slip of the fly-wheel may occur due to variation of the load on the fly-wheel due to variation of wind resistance with variations in speed but such variation in the slip is not substantial.

The weight of the centrifuge weights 39 and 57 and the manner of mounting thereof is such that the centrifugal forces exerted on the rod 42 and sleeve 62 in opposition to the yielding forces of the springs 45 and 65 are substantially the same for the same rotational speeds of the two centrifuge devices 17 and 18. In order, therefore, to cause an equivalent movement of the sleeve 62 in the right-hand direction corresponding substantially to the movement of the rod 42 when the axle rotates at a constant speed or accelerates and decelerates at low rates, the spring 65 is designed to have a proportionally lesser pick-up value than the spring 45. Thus, notwithstanding the fact that the centrifuge device 18 rotates normally at a slower speed than the centrifuge device 17, substantially the same movement of the rod 42 and sleeve 62 occurs in response to variations in axle speed as long as the normal percentage of slip or difference in speed between the centrifuge device 18 and the centrifuge device 17 is not too greatly departed from.

As long as the axle 11 rotatively accelerates at a sufficiently low rate, the normal percentage slip or lag of the centrifuge device 18 with respect to the centrifuge member 17 is not greatly exceeded. Thus, the rod 42 and sleeve 62 remain in their normal relative positions during acceleration at a low rate so that the switch contact finger 81 remains positioned between and out of contact with the contact fingers 78 and 79.

If the axle 11 rotatively accelerates at an abnormally rapid rate, however, the percentage of slip or lag in the rotational speed of the centrifuge device 18 with respect to the rotational speed of the centrifuge device 17 increases substantially above the normal value. In such case, therefore, the switch operating rod 42 is shifted a greater amount out of its normal position in the right-hand direction than is the sleeve member 62 and consequently the contact finger 81 is permitted to engage the contact finger 79 to complete the circuit for the signal lamp 85. It will thus be seen that the signal lamp 85 is illuminated only when the axle 11 rotatively accelerates at a sufficiently rapid rate.

When the axle 11 ceases to accelerate rotatively and rotates at a constant speed, the centrifuge device 18 is restored to the normal percentage slip or lag with respect to the speed of the centrifuge device 17. The switch rod 42 and sleeve 62 are thus restored to their normal relative positions and the contact finger 81 is thus shifted to its normal position centrally between and out of contact with the contact fingers 78 and 79. The circuit for the signal lamp 85 is thus interrupted and the lamp extinguished.

When the axle 11 rotatively decelerates, the centrifuge device 17 correspondingly decelerates in speed. At the same time, the combined inductor ring and fly-wheel 48 and the centrifuge device 18 rotatively decelerate due to the braking effect of air friction on the parts of the centrifuge device and friction in the bearing reces 49 and 51. Due to the momentum of the fly-wheel 48, however, the centrifuge device 18 decelerates at a lesser rate than the centrifuge device 17 and axle 11. Consequently, the percentage slip of centrifuge device 18 with respect to centrifuge device 17 decreases from the normal value.

If the rate of rotative deceleration of axle 11 and centrifuge device 17 is sufficiently low, however, the degree to which the slip of the fly-wheel 48 and centrifuge device 18 decreases from the normal percentage slip with respect to the speed of the centrifuge device 17 is such that only slight relative movement between the rod 42 and sleeve 62 occurs. Consequently, the contact finger 81 remains between and out of contact with the contact fingers 78 and 79 as long as the axle 11 rotatively decelerates at a low rate.

If the axle 11 and centrifuge device 17 decelerate at a sufficiently rapid rate, however, the fly-wheel 48 and centrifuge device 18 promptly overspeed, that is, rotate at a speed higher than the rotational speed of the axle and centrifuge device 17 because the speed of the axle and centrifuge device 17 reduces so rapidly compared to the speed of the fly-wheel 48 and centrifuge device 18. In such case, therefore, since the normal percentage slip of centrifuge device 18 with respect to centrifuge device 17 is substantially departed from, being reduced to zero and even to a negative value, the sleeve 62 will be correspondingly shifted a greater degree in the right-hand direction with respect to its normal position than the rod 42. The different degrees of movement of the rod and sleeve thus causes the rod 42 to engage the contact finger 81 and bend it in the left-hand direction into contact with the contact finger 78. The circuit for the signal lamp 84 is thus completed and the lamp illuminated only if the axle 11 rotatively decelerates at a sufficiently rapid rate.

It will be apparent that when the centrifuge device 18 and fly-wheel 48 rotate at a higher speed than the centrifuge device 17 and axle 11, that is, in negative slip relation thereto, the eddy current clutch formed by the association of the pole-pieces 31 and 32 with the inductor ring and fly-wheel 48 is converted into an eddy current brake. In such case, therefore, an eddy current braking effect is exerted on the fly-wheel 48 which is in addition to the braking effect due to the air and bearing friction.

If the axle 11 ceases to decelerate and rotates at a constant speed or begins to accelerate, the braking effect exerted on the fly-wheel 48 and centrifuge device 18 causes the centrifuge device 18 to be restored to a speed having its normal percentage slip relation with respect to the speed of the centrifuge device 17 and axle 11. In such case, therefore, the sleeve 62 and rod 42 are restored to their normal relative positions in which the contact finger 81 is correspondingly restored to its normal position substantially midway between and out of contact with the contact fingers 78 and 79. The circuit for the signal lamp 84 is thus interrupted and the lamp extinguished.

It will be apparent that as long as the centrifuge device 17 and the axle 11 rotate at a speed such that substantially less than the normal percentage slip occurs between the speed of centrifuge device 18 and centrifuge device 17, the rod 42 will remain shifted in the left-hand direction with respect to the sleeve 62 and the contact finger 81 will thus continue to engage the contact finger 78. Thus, once the contact finger 81 engages the contact finger 78, in response to deceleration of the axle 11, it will remain in engagement with the contact finger 78 until such time as the two centrifuge devices 17 and 18 are restored to their normal relative rotational speeds. The axle 11 may even accelerate, after ceasing to decelerate, but the contact finger 81 will still remain in engagement with the contact finger 78 as long as the departure from the normal percentage slip relation of centrifuge device 18 with respect to centrifuge device 17 is sufficient to maintain the contact finger 81 in engagement with the contact finger 78.

Although I have shown my decelerometer apparatus as controlling signal lamps in Fig. 1, it will be seen that the apparatus may be effective, as shown in Fig. 3, to control a suitable magnet valve device 87 which is in turn effective, when operated, to cause a rapid reduction in the degree of application of the brakes associated with a vehicle wheel whenever the vehicle wheel attains an abnormal rate of deceleration such as occurs only when the wheel slips. In such case, the engagement of the contact finger 81 with the contact finger 78 will cause completion of the energizing circuit for the magnet winding of the magnet valve. The consequent operation of the magnet valve instantly initiates a reduction in the pressure of fluid supplied to the brake cylinder 88 and thus a corresponding reduction in the degree of application of the brakes. Thereafter, as the slipping wheel ceases to decelerate and begins to accelerate back toward a speed corresponding to car speed, the contact finger 81 is maintained in engagement with the contact finger 78 thereby causing the magnet valve to continue the reduction in the degree of application of the brakes until such time as the slipping wheel is restored substantially to a speed corresponding to the speed of the car, that is, until such time as the two centrifuge devices 17 and 18 rotate at their normal relative speeds.

My decelerometer apparatus is so designed and constructed when employed in connection with vehicle brake control systems that the braking effect on the fly-wheel 48 during deceleration of the axle 11 causes the fly-wheel to rotatively decelerate at least at a rate which corresponds substantially to the normal rate of deceleration of the axle 11 under non-slipping conditions. It will thus be seen that restoration of the centrifuge device 17 to the normal rotational speed with respect to the centrifuge device 18 corresponds to the restoration of the axle 11 to a speed corresponding to car speed.

My decelerometer apparatus is thus adapted not only to operate to initiate a reduction in the degree of application of the brakes associated with a wheel substantially at the instant slipping of the wheel begins but is also inherently operative to cause the reduction in the degree of application of the brakes to continue until such time as the slipping wheel is restored substantially to car speed, that is, ceases to slip.

My decelerometer apparatus is similar, in principle, to the decelerometer apparatus disclosed and claimed in the copending application Serial No. 460,068 of Clyde C. Farmer, filed September 29, 1942, wherein the structural features are more broadly claimed than in the present application.

Having now described my invention, what I claim as new and desire to secure by Letters Patent is:

1. Acceleration and deceleration responsive apparatus comprising, in combination, a rotary element adapted to be rotated at different speeds, a combined inductor ring and fly-wheel member, magnetic means carried by said rotary element and associated with said combined inductor ring and fly-wheel in a manner to induce eddy currents therein upon rotation of the rotary element whereby said inductor ring and fly-wheel is rotatively driven at a speed having a certain normal percentage slip with respect to the rotational speed of the rotary element, a first centrifuge device rotatable in accordance with the rotational speed of the rotary element, a second centrifuge device rotatable in accordance with the rotational speed of the combined inductor ring and fly-wheel, two cooperating relatively movable elements one of which is positioned in accordance with the rotational speed of the said first centrifuge device and the other of which is positioned in accordance with the rotational speed of the said second centrifuge device, a first switch device operated in response to a predetermined degree of relative movement of said two elements in one direction, and a second switch device operated in response to a predetermined degree of relative movement of said two elements in the opposite direction.

2. Acceleration and deceleration responsive apparatus comprising, in combination, a rotary element adapted to be rotated at different speeds, a fly-wheel, eddy current clutch means associating the rotary element and the fly-wheel in a manner to cause the fly-wheel to be rotated at a speed having a normal relation to the speed of rotation of the rotary element and effective to permit the fly-wheel to rotate at a speed having an abnormal relation to the rotational speed of the rotary element only when the rotary element rotatively accelerates or decelerates at a sufficiently rapid rate, a first centrifuge device rotatable according to the rotational speed of the rotary element, a second centrifuge device rotatable according to the rotational speed of the fly-wheel, two cooperating coaxially disposed members movable axially relative to each other, one of said members being variously positioned axially in accordance with the rotational speed of the first centrifuge device and the other of said members being variously positioned axially in accordance with the rotational speed of the said second centrifuge device, and control means operated according to the relative axial positions of said cooperating members.

3. Acceleration and deceleration responsive apparatus comprising, in combination, a rotary element adapted to be rotated at different speeds, a fly-wheel, eddy current clutch means associating the rotary element and the fly-wheel in a manner to cause the fly-wheel to be rotated at a speed having a normal relation to the speed of rotation of the rotary element and effective to permit the fly-wheel to rotate at a speed having an abnormal relation to the rotational speed of the rotary element only when the rotary element rotatively accelerates or decelerates at a sufficiently rapid rate, a first centrifuge device rotatable according to the rotational speed of the rotary element, a second centrifuge device rotatable according to the rotational speed of the fly-wheel, two cooperating coaxially disposed members movable axially relative to each other, one of said members being variously positioned axially in accordance with the rotational speed of the said first centrifuge device and the other of said members being variously positioned axially in accordance with the rotational speed of the said second centrifuge device, and control means operatively responsive according to the relative axial positions of said cooperating members, said control means having an inactive position as long as the fly-wheel rotates at a speed having normal relation to the rotational speed of the rotary element and being operated to an active position as long as the fly-wheel rotates at a speed having an abnormal relation to the rotational speed of the rotary element.

4. Acceleration and deceleration responsive apparatus comprising, in combination, a rotary element adapted to be rotated at different speeds, a combined inductor ring and fly-wheel member, magnetic means carried by said rotary element and associated with said combined inductor ring and fly-wheel in a manner to induce eddy currents therein upon rotation of the rotary element and thereby cause said inductor ring and fly-wheel to be rotatively driven at a speed having a certain normal percentage slip with respect to the rotational speed of the rotary element, a first centrifuge device rotatable in accordance with the rotational speed of the rotary element, a second centrifuge device rotatable in accordance with the rotational speed of the combined inductor ring and fly-wheel, two cooperating coaxially disposed elements axially movable relative to each other, one of said two elements being variously positioned axially in accordance with the rotational speed of said first centrifuge device and the other of said two elements being variously positioned axially in accordance with the rotational speed of the said second centrifuge device, and control means operatively responsive according to the relative axial positions of said two cooperating elements.

5. Acceleration and deceleration responsive apparatus comprising, in combination, a rotary element adapted to be rotated at different speeds, a combined inductor ring and fly-wheel member, magnetic means carried by said rotary element and associated with said combined inductor ring and fly-wheel in a manner to induce eddy currents therein upon rotation of the rotary element and thereby to cause said inductor ring and fly-wheel to be rotatively driven at a speed having a certain normal percentage slip with respect to the rotational speed of the rotary element, a first centrifuge device rotatable in accordance with the rotational speed of the rotary element, a second centrifuge device rotatable in accordance with the rotational speed of the combined inductor ring and fly-wheel, two cooperating coaxially disposed elements axially movable relative to each other, one of said two elements being variously positioned axially in accordance with the rotational speed of the said first centrifuge device and the other of said two elements being variously positioned axially in accordance with the rotational speed of the said second centrifuge device, and control means operatively responsive to a certain predetermined degree of relative axial movement of said two cooperating elements.

CLAUDE M. HINES.